(12) United States Patent
Sachson

(10) Patent No.: US 12,179,116 B2
(45) Date of Patent: Dec. 31, 2024

(54) MINI-GAMES IN MUSIC EXPERIENCES

(71) Applicants: Sony Group Corporation, Tokyo (JP); Sony Corporation of America, New York, NY (US)

(72) Inventor: Thomas Sachson, Malibu, CA (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 17/472,344

(22) Filed: Sep. 10, 2021

(65) Prior Publication Data

US 2022/0080320 A1  Mar. 17, 2022

Related U.S. Application Data

(60) Provisional application No. 63/077,341, filed on Sep. 11, 2020.

(51) Int. Cl.
*A63F 13/65* (2014.01)
*A63F 13/35* (2014.01)
*A63F 13/533* (2014.01)

(52) U.S. Cl.
CPC .......... *A63F 13/65* (2014.09); *A63F 13/35* (2014.09); *A63F 13/533* (2014.09); *A63F 2300/308* (2013.01); *A63F 2300/5553* (2013.01); *A63F 2300/69* (2013.01)

(58) Field of Classification Search
CPC ........ A63F 13/65; A63F 13/35; A63F 13/533; A63F 2300/308; A63F 2300/5553
See application file for complete search history.

(56) References Cited

U.S. PATENT DOCUMENTS

| | | | |
|---|---|---|---|
| 8,986,090 B2 * | 3/2015 | Epstein | A63F 13/814 463/7 |
| 9,120,016 B2 * | 9/2015 | Epstein | A63F 13/44 |
| 10,092,823 B2 | 10/2018 | Saferin et al. | |
| 10,363,482 B2 | 7/2019 | Perry et al. | |
| 2006/0068917 A1 | 3/2006 | Snoddy | |

(Continued)

FOREIGN PATENT DOCUMENTS

| | | |
|---|---|---|
| DE | 202012007407 U1 | 11/2012 |
| EP | 1935124 A | 6/2008 |
| JP | 2019136246 A | 8/2019 |

*Primary Examiner* — William H McCulloch, Jr.
*Assistant Examiner* — Ankit B. Doshi
(74) *Attorney, Agent, or Firm* — Procopio, Cory, Hargreaves & Savitch LLP

(57) ABSTRACT

Providing an online music experience, including: a music venue system; a game device; wherein a game processor uses game data to provide a mini-game experience and present the mini-game experience through a display, wherein the game processor uses venue data to modify the mini-game experience and present the modified mini-game experience through the display, wherein the game processor receives user input and sends gameplay, wherein a system processor uses music data, video data, and the gameplay data to create a data representation of a music performance, wherein the system processor sends the data representation of the music performance to the game device, and wherein the game processor uses the data representation of the music performance to present the music performance through the display.

18 Claims, 3 Drawing Sheets

(56) References Cited

U.S. PATENT DOCUMENTS

2009/0104956 A1* 4/2009 Kay .................. A63F 13/5375
                                                    463/7
2014/0024464 A1   1/2014  Belakovsky
2016/0279511 A1   9/2016  Miller
2018/0318712 A1  11/2018  Palikuqi

* cited by examiner

MINI-GAMES IN MUSIC EXPERIENCES

CROSS-REFERENCE TO RELATED APPLICATIONS

This application claims the benefit of priority under 35 U.S.C. § 119(e) of U.S. Provisional Patent Application No. 63/077,314, filed Sep. 11, 2020, entitled "Content Orchestration, Management and Programming System". The disclosure of the above-referenced application is incorporated herein by reference.

BACKGROUND

Field

The present disclosure relates to online music experience, and more specifically, to using mini-games to enhance the music experiences.

Background

Computer-implemented games such as PC, gaming console, table, mobile phone, or any other analogous device-based games are increasingly popular, and new uses for the technology are constantly being found. The software may also be tied to certain real or virtual-world systems. However, the downside of the computer-implemented games includes decrease in user engagement and interest as the games progress over time.

SUMMARY

The present disclosure provides for complementing content experiences, such as using mini-games to enhance music experiences.

In one implementation, a system for providing an online music experience is disclosed. The system includes: a music venue system, including a system processor, a system network interface, and a system storage that stores music data, video data, and venue data; a game device, including a game processor, a display, a game user interface, a game network interface, and a game storage that stores game data; wherein the game processor uses the game data to provide a mini-game experience and present the mini-game experience through the display and the game user interface, wherein the system processor sends the venue data to the game device through the system network interface and the game network interface, wherein the game processor uses the venue data received from the music venue system to modify the mini-game experience and present the modified mini-game experience through the display and the game user interface, wherein the game processor receives user input through the game user interface and creates gameplay data, wherein the game processor sends the gameplay data to the music venue system through the game network interface and the system network interface, wherein the system processor uses the music data, the video data, and the gameplay data received from the game device to create a data representation of a music performance, wherein the system processor sends the data representation of the music performance to the game device through the system network interface and the game network interface, and wherein the game processor uses the data representation of the music performance to present the music performance through the display and the game user interface.

In one implementation, the game device is a game console. In one implementation, the game device is a mobile device. In one implementation, the game processor, the game user interface, the game network interface, and the game storage of the mobile device correspond to a mobile processor, a mobile user interface, a mobile network interface, and a mobile storage. In one implementation, the music venue system provides the mini-game experience to win prizes to decorate avatars in the online concert venue. In one implementation, the music venue system provides a music venue for a live performance by a music artist. In one implementation, the music venue system provides a representation of people attending the online performance as avatars in a virtual crowd.

In another implementation, a method for providing an online music experience using a music venue system is disclosed. The method includes: presenting, by the music venue system, a mini-game experience through a display and a game user interface using game data, wherein the music venue system includes a system processor, a system network interface, and a system storage that stores music data, video data, and venue data; sending the venue data to a game device through the system network interface and a game network interface; modifying the mini-game experience and presenting the modified mini-game experience through the display and the game user interface using the received venue data; creating gameplay data using input received through the game user interface; sending the gameplay data to the music venue system through the game network interface and the system network interface; creating a data representation of a music performance using the music data, the video data, and the gameplay data received from the game device; sending the data representation of the music performance to the game device through the system network interface and the game network interface; and presenting the music performance through the display and the game user interface using the data representation of the music performance.

In one implementation, the game device is a game console. In one implementation, the game device is a mobile device. In one implementation, the music venue system provides the mini-game experience to win prizes to decorate avatars in an online concert venue. In one implementation, the method further includes providing a music venue for a live performance by a music artist. In one implementation, the method further includes providing a representation of people attending the online performance as avatars in a virtual crowd. In one implementation, the method further includes selecting colors and textures for a game area and chairs based on information about a music venue or a song being performed by an artist.

In another implementation, a non-transitory computer-readable storage medium storing a computer program to provide an online music experience using a music venue system is disclosed. The computer program includes executable instructions that cause a computer to: present a mini-game experience through a display and a game user interface using game data, wherein the music venue system includes a system processor, a system network interface, and a system storage that stores music data, video data, and venue data; send the venue data to a game device through the system network interface and a game network interface; modify the mini-game experience and presenting the modified mini-game experience through the display and the game user interface using the received venue data; create gameplay data using input received through the game user interface; send the gameplay data to the music venue system through the game network interface and the system network interface; create a data representation of a music performance using the music data, the video data, and the gameplay data received from the game device; send the data representation of the music performance to the game device through the system network interface and the game network interface; and present the music performance through the display and the game user interface using the data representation of the music performance.

In one implementation, the computer-readable storage medium further includes executable instructions that cause the computer to provide a music venue for a live performance by a music artist. In one implementation, the computer-readable storage medium further includes executable instructions that cause the computer to provide a representation of people attending the online performance as avatars in a virtual crowd. In one implementation, the computer-readable storage medium further includes executable instructions that cause the computer to select colors and textures for a game area and chairs based on information about a music venue or a song being performed by an artist.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
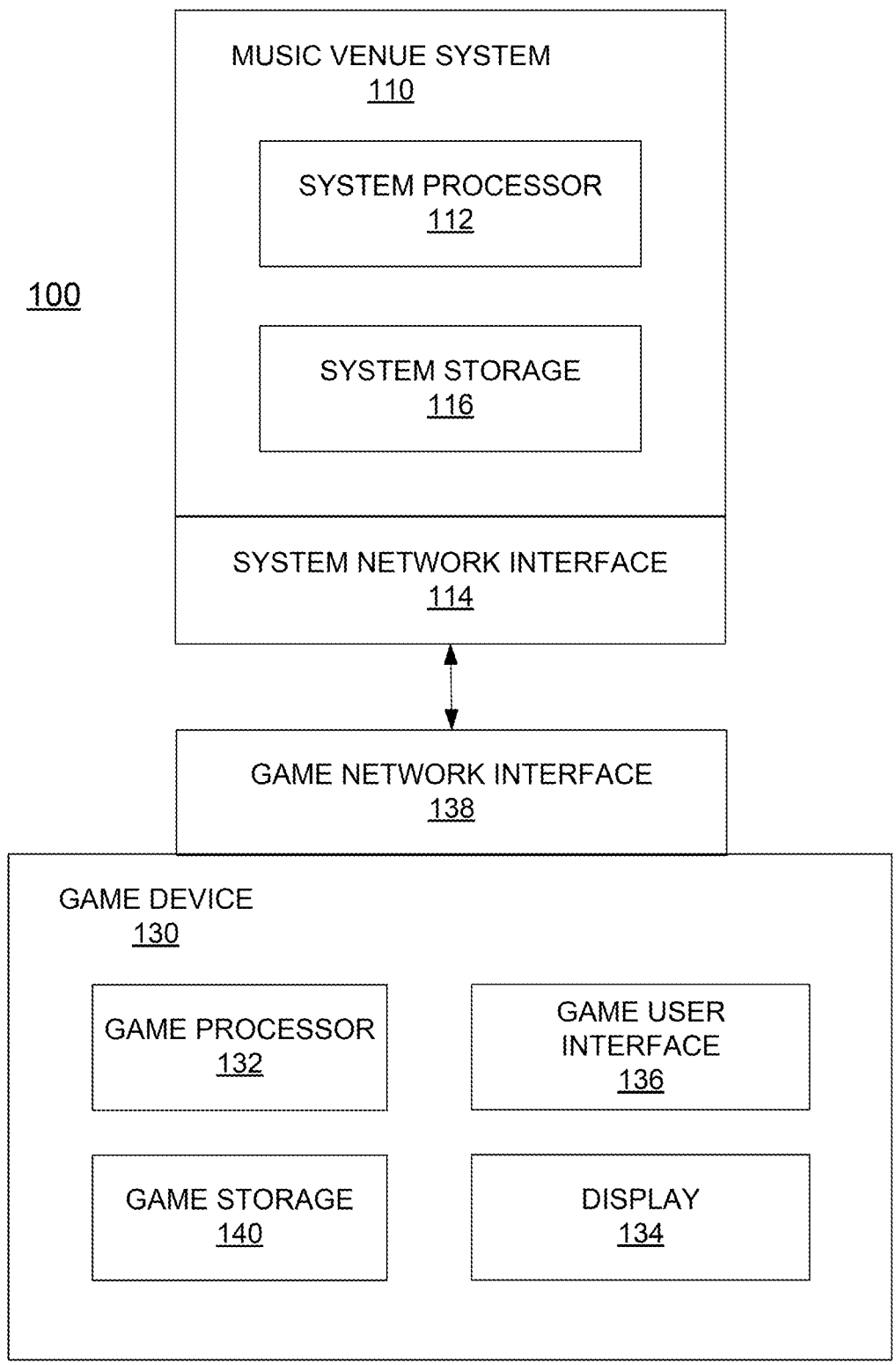
FIG. 1 is a flow diagram of a method for x in accordance with one implementation of the present disclosure.

As described above, computer-implemented games residing in relevant gaming device systems, such as those referred to above, are increasingly popular, and new uses for the technology are constantly being found. The software may also be tied to certain virtualized music world systems. However, the downside of the computer-implemented games includes decrease in user engagement and interest as the games progress over time. Accordingly, a need exists for enhancing the game experiences which are specifically designed to promote user engagement in the virtual world.

Certain implementations of the present disclosure provide for complementing content experiences, such as using mini-games to enhance music experiences. After reading below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a system implements and manages various mini-games in the context of a music-themed virtual world, where such games are specifically designed to promote user engagement in the virtual world (vis-à-vis both the platform and other users), and drive adoption rates, play times, and monetization events (sale of digital goods, sale of physical goods, interaction with brand messaging).

Features provided in implementations can include, but are not limited to, one or more of the following items:

Mini-game providing information or assets in the music experience.

Relationship between game operation and music experience. For example, the game operation is influenced by aspects of the music experience and the music experience is affected by gameplay and results of gameplay.

In the new system, one implementation for music experiences uses short game experiences or "mini-games" to enhance an online music experience. For example, mini-games in a VR or non-VR virtual computer graphics video environment that is themed to music and artists can provide themed entertainment, information, and privileges for later use (such as digital assets or goods). Other systems can apply to different types of content, such as movies, television, gaming, or information experiences, such as education, commercial, or medicine.

One example system uses a musical chairs mini-game on a mobile device with an online music venue system. In one implementation, while people wait for an online concert to start, they can play a musical chairs mini-game to win prizes to decorate avatars in the online concert venue.

An online system provides a music venue for a live performance by a music artist. The online system includes data storage and processing provided through one or more server systems. Users access the online system through network devices with display, audio, and input functionality, such as computers and mobile devices (e.g., smartphones), connected to the online system by the internet. During a performance, the system provides audio and video of the artist performance (e.g., singing, dancing, talking, moving). The system also provides a representation of people attending the online performance as avatars in a virtual crowd (e.g., animated representations of people). A user can select an avatar and customize the avatar's appearance, such as by selecting clothes or accessories for the avatar to wear, hold, or use.

A mobile device, such as a smartphone, provides a musical chairs mini-game program, such as an app or tool. The mobile device can connect to and interact with computer networks, such as the internet. A user can play the musical chairs mini-game using the mobile device, competing with other players (human or computer controlled). The musical chairs mini-game provides a reward to the winning player.

In one example, the musical chairs mini-game is a competition to sit in the last remaining chair in a game area represented as a dance floor. At the start of the game, there are many active players (such as 100) and each player has a game avatar or character. The game avatars move around in the dance floor based on control inputs from the players using their mobile devices. There are chairs on the dance floor, such as half the number of active players. When the game begins, music begins to play and the chairs begin to move around the dance floor. Players can move their game avatar to chase the chairs. Some chairs disappear (maybe later to re-emerge). Some chairs may also change format to make it harder for a user to sit in them (a chair flies away, or perhaps explodes into a pile of confetti, some chairs sprout proper legs and run away, etc.). After a period of time, the music stops and the players attempt to have their game avatar claim or sit in a chair that has remained in the virtual world and is accessible by a player. Only one avatar can sit in a chair. The mini-game resolves which avatars successfully sit (such as proximity and timing). The players whose avatar did not sit are eliminated. The avatars stand and half (or some other number) of the chairs disappear. The music starts to play again and the process repeats. This cycle continues until a single avatar remains and the player for that avatar is the winner of the mini-game.

The online system for the music venue and the musical chairs mini-game communicate through a network. The mini-game uses information from the music venue system to determine the operation and appearance of the game. For example, the mini-game uses a song by the artist performing during the concert and selects colors and textures for the game area and chairs based on information about the music venue or artist.

The mini-game informs the music venue system that the winning user has received the reward. The reward is a digital asset that the user can use to customize the user's avatar at the online music venue. For example, the reward provides a hat with a large number one or artist imagery on the front for the avatar to wear.

Rewards for mini-games can take many forms. Examples include: Information—trivia, history, biographic; Asset—image, video, audio, avatar, cosmetic decoration for other objects, active objects for the environment (e.g., that cause effects other users can experience, such as a representation of fireworks); Incentive—discount, trial license/access; and Experience—access to computer location, character, social group, service or feature (VR, non-VR 2D computer graphic video interaction, online, offline). In another example, rewards in the form of an avatar can include any digital merchandise like in-game digital skins and experience points.

Mini-game effects from experiences can take many forms. Examples include: Music—audio, lyrics, rhythms; Images and video—artist, albums, characters, promotional materials; Decoration—colors, textures, sounds; Information—names, times, biographic information, trivia, history, production information; Cross-promotion—effects based on targets related to the main experience, recommended or selected by the main experience, suggested by the main experience (by the minigame or another agent).

Mini-games are useful in many contexts in addition to music, such as gaming, movies, television, education, medical. A few additional examples include: A mini-game for a classroom experience that uses a current vocabulary list and provides rewards for decorating an online performance chart; Movie promotion hidden object game using movie character images before movie release providing digital goods and discounts for cosmetic assets in an online social system; Medical history trivia game related to current test results to enhance customization options for medical portal; and Retail puzzle game that builds an image of product to unlock product information and a discount in the online retail store.

Additional examples of mini-games include: Musical Chairs. One against many; Instant elimination—Music plays and contestants need to walk around chairs (sometimes circles, sometimes other shapes, sometimes no shape at all but just players running around the virtual world looking for any chair to sit in before the music stops). When music stops those not sitting down are eliminated. Also, the chair may run away from users, explode, disappear, or have special prizes associated with them. Also, when not enough real-life players to play game, the virtual world administrator can insert artificial players (non-player characters, or "NPCs") to fill out the game. This is the first such implementation within a musically themed virtual world where a user's predictive chair finding and music play anticipation abilities are the basis for a competitive game. This is the first such implementation within a musically themed virtual world where a user's predictive chair finding and music play anticipation abilities are the basis for a competitive game, and such validation is driven through the use of artificial players (NPCs). Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Repeat Musical Notes Memory Game. One against another or many. Instant elimination. Music notes or tones play and the participants need to recall and play back the same in the same order as was played to them. Each round a new musical note or tone is added, and the participants must recall the pattern in order so as not to be eliminated. Game continues until only one player remains with an unbroken correct string of correct repeats of musical notes or tones. This is the first such implementation within a musically themed virtual world where a user's music-oriented sound memorization abilities are the basis for a competitive game. This is the first such implementation within a musically themed virtual world where a user's music-oriented sound memorization abilities are the basis for a competitive game, and where such mechanism is powered through machine generated random music notes or tones. Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Repeat Musical Facts Memory Game. One against another or many. Instant elimination. Music facts (musical terms, artist names, song names) are presented and the participants need to recall and repeat back the same in the same order as was presented to them. Each round a new musical fact is added, and the participants must recall the pattern in order so as not to be eliminated. Game continues until only one player remains with an unbroken correct string of correct repeats of musical facts. This is the first such implementation within a musically themed virtual world where a user's music-oriented fact memorization abilities are the basis for a competitive game. This is the first such implementation within a musically themed virtual world where a user's music-oriented fact memorization abilities are the basis for a competitive game, and where such mechanism is powered through machine generated random music-oriented facts. Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Repeat Dance Moves Memory Game. One against another or many. Instant elimination. Dance moves are shown and the participants need to recall and play back the same dance moves in the same order as was shown to them. Each round a new dance move is added, and the participants must recall the pattern in order so as not to be eliminated. Game continues until only one player remains with an unbroken correct string of correct repeats of dance moves. This is the first such implementation within a musically themed virtual world where a user's music-oriented dance move memorization abilities are the basis for a competitive game. This is the first such implementation within a musically themed virtual world where a user's music-oriented dance move memorization abilities are the basis for a competitive game, and where such mechanism is powered through machine generated random dance moves. Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Virtual Tag. One against many. Instant elimination. Music plays and contestants need to run around and tag another player to make them "it". If the music stops, those players that have not been "tagged back" proceed to the next level. All others are eliminated. Also, when not enough real-life players to play game, the virtual world administrator can insert artificial players (nonplayer characters, or "NPCs") to fill out the game. Last player untagged by end of game wins. This is the first such implementation within a musically themed virtual world where a user's targeting and avoidance abilities are the basis for a competitive game. This is the first such implementation within a musically themed virtual world where a user's targeting and avoidance abilities are the basis for a competitive game, and where such validation is driven through the use of artificial players (NPCs). Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Stage Die-Ver. One against many. Players are required to jump off progressively higher stages (higher stages mean higher points) into crowds of non-player character fans, and do so as many times as possible while the music is playing. The challenge is to make sure the diver lands in an appropriately dense area of fans, which are constantly moving to and from beneath the stage. If the player mistimes the dive and not enough fans are there to catch him, then they are eliminated. This is the first such implementation within a musically themed virtual world where a user's timing and depth perception abilities are the basis for a competitive game. This is the first such implementation within a musically themed virtual world where a user's timing and depth perception abilities are the basis for a competitive game, and where such validation is driven through the use of artificial players (NPCs). Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Hide & Seek. One against many and team play. Instant elimination. NPCs seek out real players hiding in various obscure part of the world while a song plays. When found by a seeking NPC the hiding player is eliminated. To make it harder to hide, players will be required to leave their hiding places periodically and find new hiding areas. Last player undiscovered by end of game wins. Game also may be played by teams of real players where some are hiders and some are seekers. The team with the most finds or hides at the end of the timed period/song play wins. This is the first such implementation within a musically themed virtual world where a user's hiding and/or seeking abilities are the basis for a competitive game. This is the first such implementation within a musically themed virtual world where a user's hiding and/or seeking abilities are the basis for a competitive game, and where such validation is driven through the use of artificial players (NPCs). Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: King Of The Mountain. One against many. Instant elimination. All participants are deposited on a giant record player that starts to spin when the music starts. During the course of the playing, the record slowly spins and players must run toward the center to keep from flying off the edge due to the faster speed at the edge of the record. At the same time, a large record needle and arm is making its way toward the center of the record and when it hits a player, the player is automatically caste off of the spinning record. Also, when not enough real-life players to play game, the virtual world administrator can insert artificial players (non-player characters, or "NPCs") to fill out the game. Last player standing on the record by end of game wins. This is the first such implementation within a musically themed virtual world where a user's avoidance abilities are the basis for a competitive "king of the mountain" game. This is the first such implementation within a musically themed virtual world where a user's avoidance abilities are the basis for a competitive "king of the mountain" game, and where such validation is driven through the use of artificial players (NPCs). Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Karaoke Contests. One against another or many. Instant elimination. Greatest applause from other players wins, with applause generated by striking the game controller a particular way, shouting into player microphone, or some other analogous action taken by the user. This is the first such implementation within a musically themed virtual world where other peers vote on success or failure of competing parties. This is the first such implementation within a musically themed virtual world where other peers vote on success or failure of competing parties by interacting in real time with user interface devices (e.g., game controllers, microphones, motion sensors). Requires interaction by contestant with other contestants, as well as with judges. The contest may be sponsored by a brand, with prizes to winners provided by brands. Participants can earn system points, virtual coins, status, digital march, or other items of value through their involvement and success in the competition.

Additional examples of mini-games include: Dancing Contests. One against another or many. Instant elimination. Greatest applause from other players wins, with applause generated by striking the game controller a particular way, shouting into player microphone, or some other analogous action taken by the user. This is the first such implementation within a musically themed virtual world where other peers vote on success or failure of competing parties. This is the first such implementation within a musically themed virtual world where other peers vote on success or failure of competing parties by interacting in real time with user interface devices (e.g., game controllers, microphones, motion sensors). Requires interaction by contestant with other contestants, as well as with judges. The contest may be sponsored by a brand, with prizes to winners provided by brands. Participants can earn system points, virtual coins, status, digital march, or other items of value through their involvement and success in the competition.

Additional examples of mini-games include: Music Themed Scavenger Hunts. Individual play and team play. Music plays and contestants need to quickly find as many point generating items as possible. Some items are to be found through random searching, while other items are to be found by solving music themed (or not) riddles or accomplishing tasks within the virtual music world. When the song ends the player and/or team with the most found items wins. This is the first such implementation within a musically themed virtual world where a user's discovery and puzzle solving abilities are the basis for a competitive game. This is the first such implementation within a musically themed virtual world where a user's discovery and puzzle solving abilities are the basis for a competitive game, and where such item placement and riddle generation may be randomly machine generated. Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Capture-The-Song. Team play. Instant elimination. Music plays and contestants need to strategically find a way to capture the other team's golden record. In the course of trying the capture the golden record, players may shoot at each other with music inspired weapons, making this a game of shooting skill, as well as tactical team execution. When the golden record has been captured by an opposing team and returned to that team's headquarters, the game ends. Also, when not enough real-life players to play game, the virtual world administrator can insert artificial players (non-player characters, or "NPCs") to fill out the game. This is the first such implementation within a musically themed virtual world where a user's shooting and strategic abilities are the basis for a competitive game. This is the first such implementation within a musically themed virtual world where a user's shooting and strategic abilities are the basis for a competitive game, and where such validation is driven through the use of artificial players (NPCs). Requires interaction by contestant with other contestants. The contest may be sponsored by a brand, with prizes to winners provided by brands. Participants can earn system points, virtual coins, status, digital march, or other items of value through their involvement and success in the competition.

Additional examples of mini-games include: Daily/Weekly/Monthly Song Chart Derby. One against many. The player that correctly predicts which songs perform the best on the charts (Spotify, Billboard, etc.) in a given time period win prizes, status, recognition of peers, etc. This is the first such implementation within a musically themed virtual world where a user's predictive abilities pertaining to musical performance are the basis for a competitive game. This is the first such implementation within a musically themed virtual world where a user's predictive abilities pertaining to musical performance are the basis for a competitive game, and where such validation is driven through real-time streaming data. Requires interaction by contestant with various music verticals, and in turn the community of users that are most likely to educate the user on song performance. The contest may be sponsored by a brand, with prizes to winners provided by brands. Participants can earn system points, virtual coins, status, digital march, or other items of value through their involvement and success in the competition.

Additional examples of mini-games include: Demolition Derby. One against another or many. The player that can wreck a hotel room, concert venue, or analogous musical setting in the shortest period of time, with the greatest "combos" (TV thrown through window, guitar smashed on amp, guitar lit on fire and then smashed on amp) earns the most points. Points may also be determined by users that watch and judge, with greatest applause or cheering culminating in the most points for a contestant. This is the first such implementation within a musically themed virtual world where an artificial intelligence and/or other peers vote on success or failure of competing parties. This is the first such implementation within a musically themed virtual world where an artificial intelligence and/or other peers vote on success or failure of competing parties by interacting in real time with user interface devices (e.g., game controllers, microphones, motion sensors). Requires interaction by contestant with other contestants, as well as with judges. The contest may be sponsored by a brand, with prizes to winners provided by brands. Participants can earn system points, virtual coins, status, digital march, or other items of value through their involvement and success in the competition.

Additional examples of mini-games include: Dance. Dancing contests (not p2p). Hit enough moves and collect points/rewards from system.

Additional examples of mini-games include: Resource/location competitions, pushing. Musical chairs.

Record player/king of the mountain game (needle knocks people off). Staying on a moving record, arm knocks people off.

Battle Royales. New music "Fight Club" room ("March Madness" for new songs stream counts from public sources—And winner gets big prize). "Battle Royale" games to earn status/levels and rewards (e.g., coin, digital merch).→Musical Chairs, Song Guardian Battles (Single-Elimination), Wall of Death, Karaoke (Most Claps Wins/Single-Elimination), Additional examples of mini-games include: Memory game for motion. Dance moves.

Additional examples of mini-games include: Memory game for music, notes, lyrics, artists, titles, albums. Repeat Musical Note Game (Repeat 1 Note, Then 2 Notes, Then 3 Notes, Etc.). One player or multiplayer. Repeat Artist Name Game (Repeat 1 Artist Name, Then 2 Artist Names, Then 3 Artist Names, Etc.). One player or multiplayer. Repeat Dance Move Game (Repeat 1 Move, Then 2 Moves, Then 3 Moves, Etc.). One player or multiplayer. Harder for user, but makes use of our built dance mechanic.

Additional examples of mini-games include: Tag. Battle Royale Tag (multiple 2-minute rounds where persons tagged the least move to next round). 50 to 25 to 10 to 3 to 1). Add NPCs for difficulty.

Additional examples of mini-games include: Races. Medley Races—Combine several mini-games into one timed event for single or multiplayer. Relay Races—Medley races but with teams.

Additional examples of mini-games include: Hide and Seek (musical note trails lead you to players, etc).

Additional examples of mini-games include: Egg/water balloon toss. Water balloon/egg toss (timed to music for efficacy, etc.). Need to throw egg every three seconds accurately and have it in hand when music stops. Extra points for throwing to beat, etc.

Additional examples of mini-games include: Scavenger hunt, hidden object. Timed Team Scavenger Hunts—Collect all the artist/album song singles you can in a 10-minute session. Artist centric or genre/sub-genre centric Scavenger Hunts with rewards.

Additional examples of mini-games include: Scavenger hunt for prizes and digital assets; Scavenger hunts (location, skill, chance); Simple skill games like tap to flap or fly (type), Cornhole, Carnival Ball Throw, Shooting Range, Bowling Alley—objects thrown or shot are artists, records, guitars, speakers, disco balls, etc. Non-cash wagering possible (see risk/loss row); Role Playing Game—Label Exec Role playing game narration where highest scoring players have status in music industry world, such as Mayor, Tenant, Tourist, etc.—Neighborhood Boss Role playing game narration where highest scoring players have status in virtual world, such as Mayor, Tenant, Tourist, etc.

Additional examples of factors in mini-game structure and relationships include: Balancing. Make sure that any competition between two users is evenly matched (no "pay-to-progress" advantage); Competition. Include leaderboard for all mini-games and ability to push data out to others; Elements of Loss/Risk. Incorporate gaming aspect where losers in games lose something (use of song for a week, etc.) unless they power it back up (needing coins, or "decibel dust" etc.); Wagering (RMT or virtual, system items); Status. Passport that gets virtually stamped as you go into different cities/neighborhoods/rooms and that passport can be seen by other users; Sweepstakes. Enter to win (pay, earn, or free to enter).

FIG. 1 is a block diagram of a system 100 for providing an online music experience in accordance with one implementation of the present disclosure. In the illustrated implementation of FIG. 1, the system 100 includes a music venue system 110 and a game device 130. In one implementation, the music venue system 110 includes a system processor 112, a system network interface 114, and a system storage 116 that stores music data, video data, and venue data. In one implementation, the game device 130 includes a game processor 132, a display 134, a game user interface 136, a game network interface 138, and a game storage 140 that stores game data.

In one implementation, the game processor 132 uses the game data to provide a mini-game experience and present the mini-game experience through the display 134 and the game user interface 136, while the system processor 112 sends the venue data to the game device 130 through the system network interface 114 and the game network interface 138. The game processor 132 uses the venue data received from the music venue system 110 to modify the mini-game experience and present the modified mini-game experience through the display 134 and the game user interface 136. The game processor 132 also receives user input through the game user interface 136 and creates gameplay data, and sends the gameplay data to the music venue system 110 through the game network interface 138 and the system network interface 114. The system processor 112 uses the music data, the video data, and the gameplay data received from the game device 130 to create a data representation of a music performance, and sends the data representation of the music performance to the game device 130 through the system network interface 114 and the game network interface 138. The game processor 132 also uses the data representation of the music performance to present the music performance through the display 134 and the game user interface 138.

In one implementation, the game device 130 is a game console. In one implementation, the game device 130 is a mobile device. In one implementation, the game processor 132, the game user interface 136, the game network interface 138, and the game storage 140 of the mobile device 130 correspond to a mobile processor, a mobile user interface, a mobile network interface, and a mobile storage. In one implementation, the music venue system 110 provides the mini-game experience to win prizes to decorate avatars in the online concert venue. In one implementation, the music venue system 110 provides a music venue for a live performance by a music artist. In one implementation, the music venue system 110 provides a representation of people attending the online performance as avatars in a virtual crowd.

Figure 2:
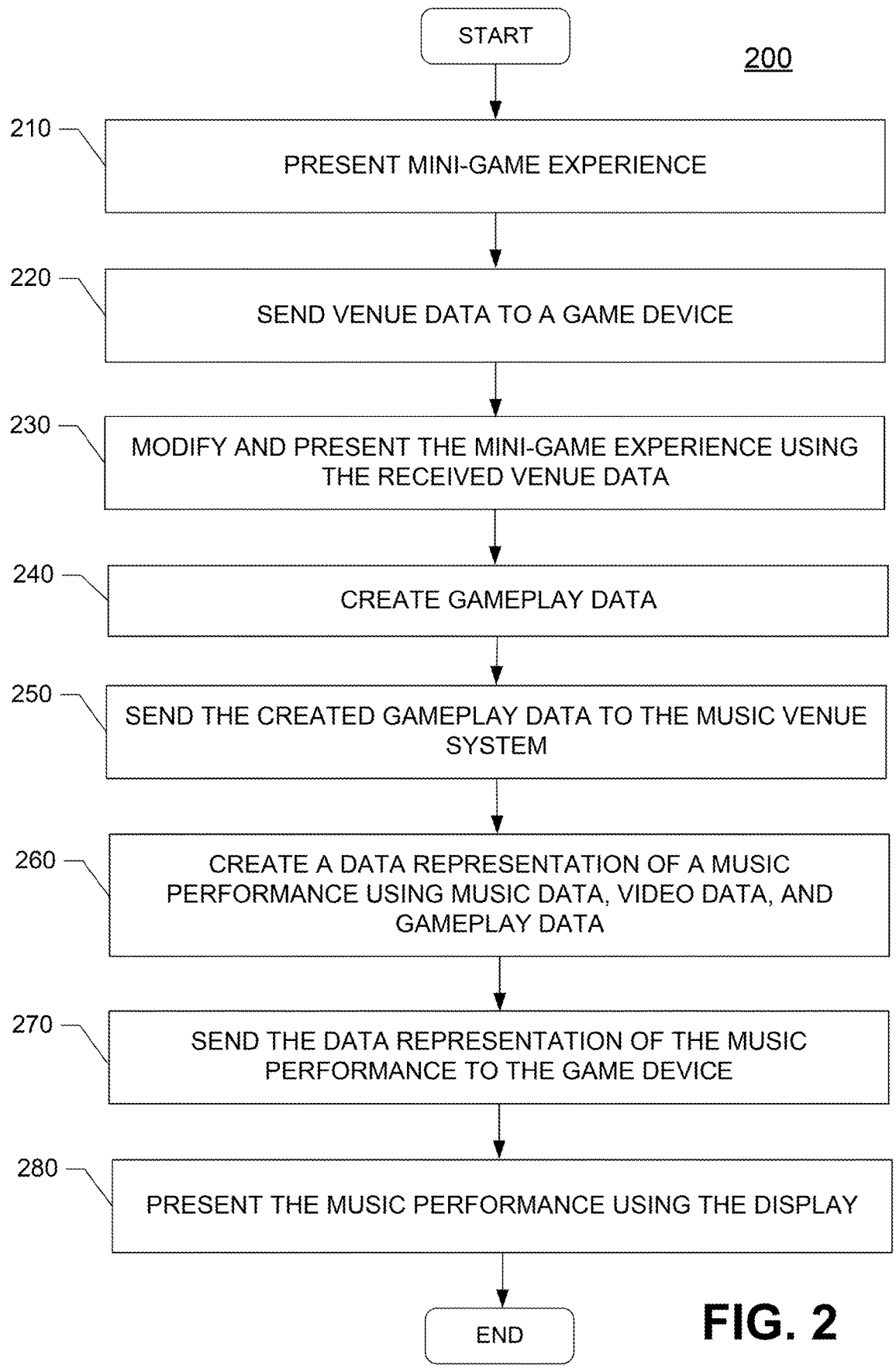
FIG. 2 is a block diagram of a system for x in accordance with one implementation of the present disclosure.

FIG. 2 is a flow diagram of a method 200 for providing an online music experience using a music venue system in accordance with one implementation of the present disclosure. In the illustrated implementation of FIG. 2, a mini-game experience presented, at step 210, by the music venue system through a display and a game user interface using game data, wherein the music venue system includes a system processor, a system network interface, and a system storage that stores music data, video data, and venue data. The venue data is then sent to a game device, at step 220, through the system network interface and a game network interface. The mini-game experience is modified and presented, at step 230, through the display and the game user interface using the received venue data. The gameplay data is created, at step 240, using input received through the game user interface, and sent to the music venue system, at step 250, through the game network interface and the system network interface. A data representation of a music performance is created, at step 260, using the music data, the video data, and the gameplay data received from the game device, and sent to the game device, at step 270, through the system network interface and the game network interface. The music performance is then presented, at step 280, through the display and the game user interface using the data representation of the music performance.

In one implementation, the method further includes providing a music venue for a live performance by a music artist. In one implementation, the method further includes providing a representation of people attending the online performance as avatars in a virtual crowd. In one implementation, the method further includes selecting colors and textures for a game area and chairs based on information about a music venue or a song being performed by an artist.

Figure 3A:
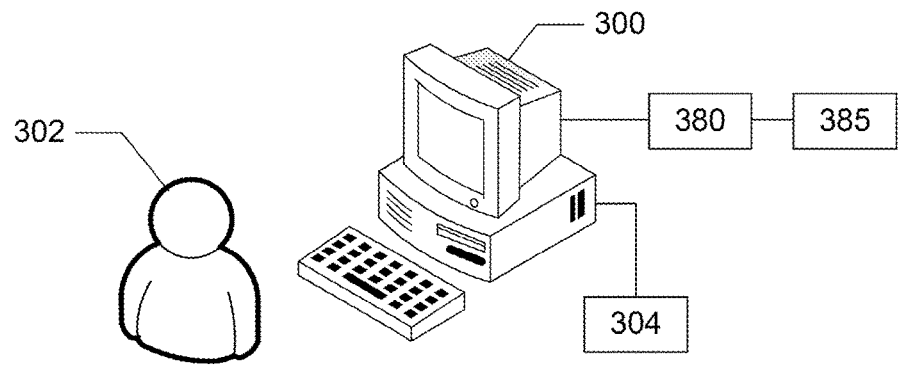
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a music experience application 390 as illustrated and described with respect to the system 100 of the block diagram shown in FIG. 1 and the method 200 illustrated in FIG. 2.

Figure 3B:
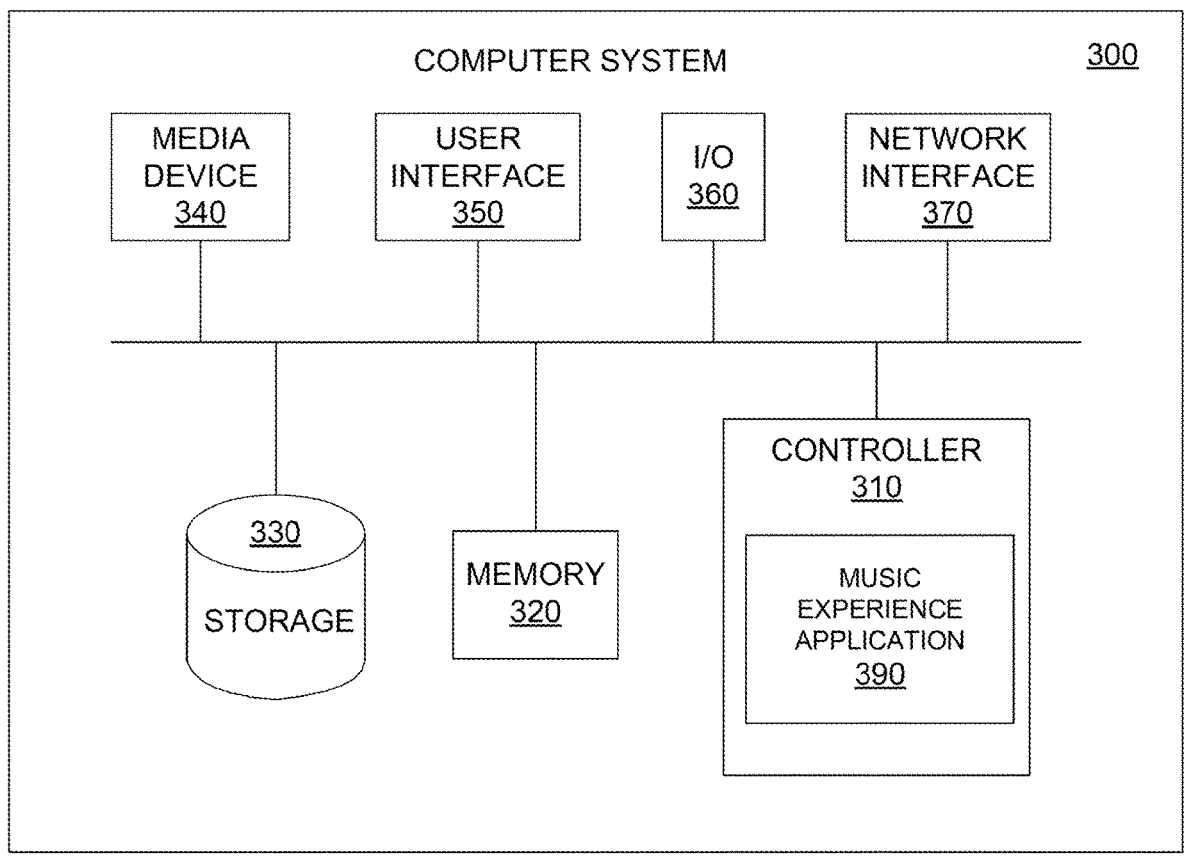
FIG. 3B is a functional block diagram illustrating the computer system hosting the procedural generation application in accordance with an implementation of the present disclosure.

The computer system 300 stores and executes the music experience application 390 of FIG. 3B. In addition, the computer system 300 may be in communication with a software program 304. Software program 304 may include the software code for the music experience application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the music experience application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the music experience application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the music experience application 390 with a software system, such as to enable the creation and modification within the music experience application 390. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the music experience application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

In one implementation, the system 100 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 100 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for providing a mini-game experience within a virtual world of a computer-implemented game to enhance enjoyment of an online music experience, comprising:
a music venue system, including a system processor, a system network interface, and a system storage that stores music data, video data, and venue data;
a game device, including a game processor, a display, a game user interface, a game network interface, and a game storage that stores gameplay data for the computer-implemented game;
wherein the game processor uses the gameplay data to provide the mini-game experience and present the mini-game experience through the display and the game user interface,
wherein the mini-game experience includes playing multiple mini-games within a music-themed world of the computer-implemented game,
wherein the mini-games are designed to promote user engagement in the virtual world by increasing play times and monetization events including sale of digital goods, sale of physical goods, and interaction with brand messaging,
wherein the system processor sends the venue data to the game device through the system network interface and the game network interface,
wherein the game processor uses the venue data received from the music venue system to modify the mini-game experience and present the modified mini-game experience through the display and the game user interface,
wherein the game processor receives user input through the game user interface and creates the gameplay data,
wherein the game processor sends the gameplay data to the music venue system through the game network interface and the system network interface,
wherein the system processor uses the music data, the video data, and the gameplay data received from the game device to create a data representation of a music performance,
wherein the system processor sends the data representation of the music performance to the game device through the system network interface and the game network interface, and
wherein the game processor uses the data representation of the music performance to present the music performance through the display and the game user interface.

2. The system of claim 1, wherein the game device is a game console.

3. The system of claim 1, wherein the game device is a mobile device.

4. The system of claim 3, wherein the game processor, the game user interface, the game network interface, and the game storage of the mobile device correspond to a mobile processor, a mobile user interface, a mobile network interface, and a mobile storage.

5. The system of claim 1, wherein the music venue system provides the mini-game experience to win prizes to decorate avatars in the online concert venue.

6. The system of claim 1, wherein the music venue system provides a music venue for a live performance by a music artist.

7. The system of claim 1, wherein the music venue system provides a representation of people attending the online performance as avatars in a virtual crowd.

8. A method for providing a mini-game experience within a virtual world of a computer-implemented game to enhance enjoyment of an online music experience using a music venue system, comprising:
presenting, by the music venue system, the mini-game experience through a display and a game user interface using gameplay data,
wherein the mini-game experience includes playing multiple mini-games within a music-themed world of the computer-implemented game,
wherein the mini-games are designed to promote user engagement in the virtual world by increasing play times and monetization events including sale of digital goods, sale of physical goods, and interaction with brand messaging,
wherein the music venue system includes a system processor, a system network interface, and a system storage that stores music data, video data, and venue data;
sending the venue data to a game device through the system network interface and a game network interface;
modifying the mini-game experience and presenting the modified mini-game experience through the display and the game user interface using the received venue data;
creating the gameplay data using input received through the game user interface;
sending the gameplay data to the music venue system through the game network interface and the system network interface;
creating a data representation of a music performance using the music data, the video data, and the gameplay data received from the game device;
sending the data representation of the music performance to the game device through the system network interface and the game network interface; and
presenting the music performance through the display and the game user interface using the data representation of the music performance.

9. The method of claim 8, wherein the game device is a game console.

10. The method of claim 8, wherein the game device is a mobile device.

11. The method of claim 8, wherein the music venue system provides the mini-game experience to win prizes to decorate avatars in an online concert venue.

12. The method of claim 8, further comprising providing a music venue for a live performance by a music artist.

13. The method of claim 8, further comprising
providing a representation of people attending the online performance as avatars in a virtual crowd.

14. The method of claim 8, further comprising
selecting colors and textures for a game area and chairs based on information about a music venue or a song being performed by an artist.

15. A non-transitory computer-readable storage medium storing a computer program to provide a mini-game experience within a virtual world of a computer-implemented game to enhance enjoyment of an online music experience using a music venue system, the computer program comprising executable instructions that cause a computer to:
present a mini-game experience through a display and a game user interface using gameplay data,
wherein the mini-game experience includes playing multiple mini-games within a music-themed world of the computer-implemented game, wherein the mini-games are designed to promote user engagement in the virtual world by increasing play times and monetization events including sale of digital goods, sale of physical goods, and interaction with brand messaging, wherein the music venue system includes a system processor, a system network interface, and a system storage that stores music data, video data, and venue data;

send the venue data to a game device through the system network interface and a game network interface;

modify the mini-game experience and presenting the modified mini-game experience through the display and the game user interface using the received venue data;

create the gameplay data using input received through the game user interface;

send the gameplay data to the music venue system through the game network interface and the system network interface;

create a data representation of a music performance using the music data, the video data, and the gameplay data received from the game device;

send the data representation of the music performance to the game device through the system network interface and the game network interface; and present the music performance through the display and the game user interface using the data representation of the music performance.

16. The non-transitory computer-readable storage medium of claim 15, further comprising executable instructions that cause the computer to
provide a music venue for a live performance by a music artist.

17. The non-transitory computer-readable storage medium of claim 15, further comprising executable instructions that cause the computer to
provide a representation of people attending the online performance as avatars in a virtual crowd.

18. The non-transitory computer-readable storage medium of claim 15, further comprising executable instructions that cause the computer to
select colors and textures for a game area and chairs based on information about a music venue or a song being performed by an artist.

* * * * *